United States Patent [19]
Chakrabarti

[11] Patent Number: 6,005,608
[45] Date of Patent: Dec. 21, 1999

[54] THREE-DIMENSIONAL DISPLAY APPARATUS

[75] Inventor: Swapan Chakrabarti, Lawrence, Kans.

[73] Assignee: The University of Kansas, Lawrence, Kans.

[21] Appl. No.: 08/851,116

[22] Filed: May 5, 1997

Related U.S. Application Data

[60] Provisional application No. 60/016,965, May 6, 1996.

[51] Int. Cl.$^6$ .............................. H04N 7/18; G09G 5/00; G02B 27/22
[52] U.S. Cl. ................................. 348/46; 348/51; 345/6; 359/462
[58] Field of Search .................................. 348/36, 37, 39, 348/40, 46, 42, 51; 345/4, 5, 6, 102, 108, 110; 359/479, 462

[56] References Cited

U.S. PATENT DOCUMENTS

| | | |
|---|---|---|
| 2,810,318 | 10/1957 | Dockhorn . |
| 3,079,959 | 3/1963 | Johnston . |
| 3,154,636 | 10/1964 | Schwertz ..................................... 345/4 |
| 3,555,349 | 1/1971 | Munz . |
| 3,891,305 | 6/1975 | Fader . |
| 3,970,361 | 7/1976 | Di Matteo et al. . |
| 4,472,737 | 9/1984 | Iwasaki . |
| 4,639,081 | 1/1987 | O'Brien ..................................... 345/4 |
| 4,670,744 | 6/1987 | Buzak . |
| 5,003,444 | 3/1991 | Secka et al. . |
| 5,042,909 | 8/1991 | Garcia, Jr. et al. . |
| 5,057,827 | 10/1991 | Nobile et al. . |
| 5,067,167 | 11/1991 | Berger . |
| 5,148,310 | 9/1992 | Batchko ................................. 359/479 |
| 5,161,054 | 11/1992 | Williams, Jr. et al. . |
| 5,172,266 | 12/1992 | Garcia et al. . |
| 5,257,086 | 10/1993 | Fateley et al. . |
| 5,455,196 | 10/1995 | Frazier . |
| 5,479,185 | 12/1995 | Biverot ....................................... 345/6 |
| 5,592,215 | 1/1997 | Kuga ......................................... 348/51 |
| 5,627,554 | 5/1997 | Jefferson ..................................... 345/5 |
| 5,650,813 | 7/1997 | Gilblom et al. .......................... 348/36 |
| 5,703,606 | 12/1997 | Blundell ..................................... 345/6 |
| 5,754,147 | 5/1998 | Tsao et al. ................................. 345/6 |
| 5,801,666 | 9/1998 | MacFarlane ............................... 345/4 |
| 5,867,152 | 2/1999 | Sextro ..................................... 345/207 |

Primary Examiner—Anand S. Rao
Attorney, Agent, or Firm—Hovey, Williams, Timmons & Collins

[57] ABSTRACT

A three-dimensional display apparatus (10) for displaying true three-dimensional images that can be viewed without special three-dimensional eye glasses is disclosed. The apparatus includes a screen (12), a screen moving assembly (14) for moving the screen to a selected number of depth locations, and an imaging assembly (16) for displaying images on the screen as it is moved to its different depth locations. The imaging assembly includes a CRT (80) for successively generating the two-dimensional images as the screen is moved, a focusing system (82) for focusing the images from the CRT to the screen, and a control system (84) for driving the CRT. The control system includes a frame buffer processor (92) for receiving a signal representative of a three-dimensional image and for separating the signal into a number of two-dimensional images, an active pixels processor (94) for selecting only the active pixels for each image, and a graphics driver (96) responsive to the active pixels processor for turning on only the active pixels of the CRT for each two-dimensional image in synchronization with the back and forth movement of the projection screen.

22 Claims, 5 Drawing Sheets

THREE-DIMENSIONAL DISPLAY APPARATUS

RELATED APPLICATIONS

This application claims the priority benefit under 35 U.S.C. Section 119(e) of U.S. Provisional Patent Application Ser. No. 60/016,965, entitled Voldiscopes, filed May 6, 1996.

BACKGROUND OF THE INVENTION

1. Field of the Invention

The present invention relates to a three dimensional display apparatus that displays true three dimensional images that can be viewed without the use of three-dimensional eye glasses.

2. Description of the Prior Art

Three-dimensional images improve the visual effects of video devices such as movies, televisions, video games, computer graphics, and radar imaging devices. Numerous display devices have been proposed to provide three-dimensional images. One type of prior art display device uses specially-designed "three-dimensional" or stereo vision glasses for simulating three-dimensional images on a two-dimensional display screen. This type of device is unsatisfactory because viewers often object to wearing the special glasses, especially viewers who already wear vision correcting eyewear.

Other types of prior art display devices use vibrating mirrors or multiple, stacked two-dimensional screens to display three-dimensional images. While these types of devices create actual three-dimensional displays, they have not been commercially successful because of high costs, poor reliability and poor resolution.

Another type of prior art display device separates the information from a three-dimensional image into several two-dimensional planes. The two-dimensional planes are then individually generated on a CRT screen while the CRT screen is moved back and forth to different depth locations. This type of display requires the focusing parameters of the system to be continuously adjusted electromechanically as the screen is moved back and forth. Additionally, the mechanical system that moves the CRT screen successively stops and restarts the screen at each of the endpoints of the viewing region, and in doing so, generates excessive noise and vibration. Specifically, the screen moving system for this type of prior art display consists of a mechanical cam system including a plurality of wheels each having a diameter equal to the size of the display depth space, a pair of linear slides that move the distance of the depth space, and a long rod coupled between the wheels and the slides for moving the slides back and forth as the wheels rotate. This type of screen moving system is large and heavy and generates excessive noise and vibration during operation.

Another known type of three-dimensional display uses laser beams and high-precision optical components to access pixels on a rotating helical screen. Although this type of device is much quieter than the previously described display, it is extremely expensive and therefore not practical for most uses. Additionally, this type of device can access only a small, fixed number of pixels over a three-dimensional volume.

OBJECTS AND SUMMARY OF THE INVENTION

In view of the foregoing, it is an object of the present invention to provide an improved three-dimensional display device.

It is a more particular object of the present invention to provide a three-dimensional display device that provides a high resolution display of actual three-dimensional images and that is reliable and relatively inexpensive to manufacture.

The present invention achieves these objects and other objects that become evident from the description of the preferred embodiments of the invention herein by providing an improved three-dimensional display apparatus. The display apparatus broadly includes a screen, means for moving the screen to a selected number of depth locations, and an imaging assembly for displaying images on the screen as it is moved.

The preferred screen moving means consists of a motor driven pulley and bearing system that continually moves the screen to its various depth locations without stopping the movement of the screen. This significantly limits the noise and vibration of the display apparatus.

The preferred imaging assembly includes a CRT for generating two-dimensional images, a focusing system for focusing the images from the CRT to the screen, and a control system for driving and controlling the operation of the CRT in synchronization with the back and forth movement of the screen. The focusing system creates large depth-of-focus either using a small fixed aperture or by changing the size of the aperture electronically as the projection screen is moved back and forth.

The preferred control system includes means for receiving a signal representative of a three-dimensional image and for separating the signal into a number of two-dimensional images equal to the number of screen depth locations and a graphics driver for driving the CRT to successively generate the two-dimensional images in synchronization with the movement of the screen. The control system also includes means for directing the graphics driver and CRT to access only those CRT pixels that are active for each two-dimensional image. This reduces the number of pixels that must be activated on the CRT for each two-dimensional image so that a conventional graphics driver may be used.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figures 1, 2:
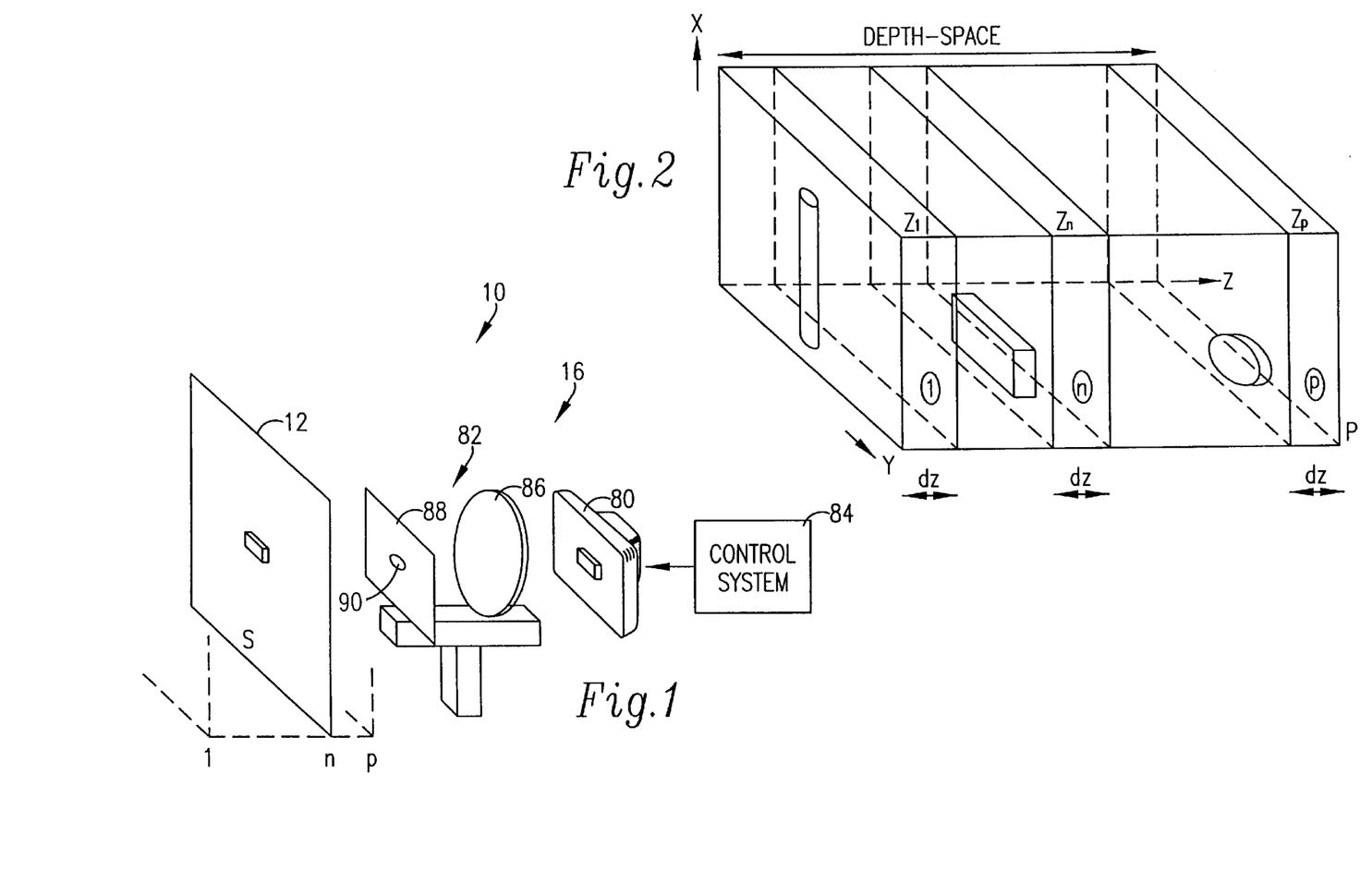
FIG. 1 is a schematic diagram shown in isometric view of a display apparatus constructed in accordance with a preferred embodiment of the invention.
FIG. 2 is a schematic diagram shown in isometric view of a three-dimensional viewing region created by the display apparatus of the present invention wherein several images in the viewing region are shown at different depth locations.
Figures 3, 4, 5:
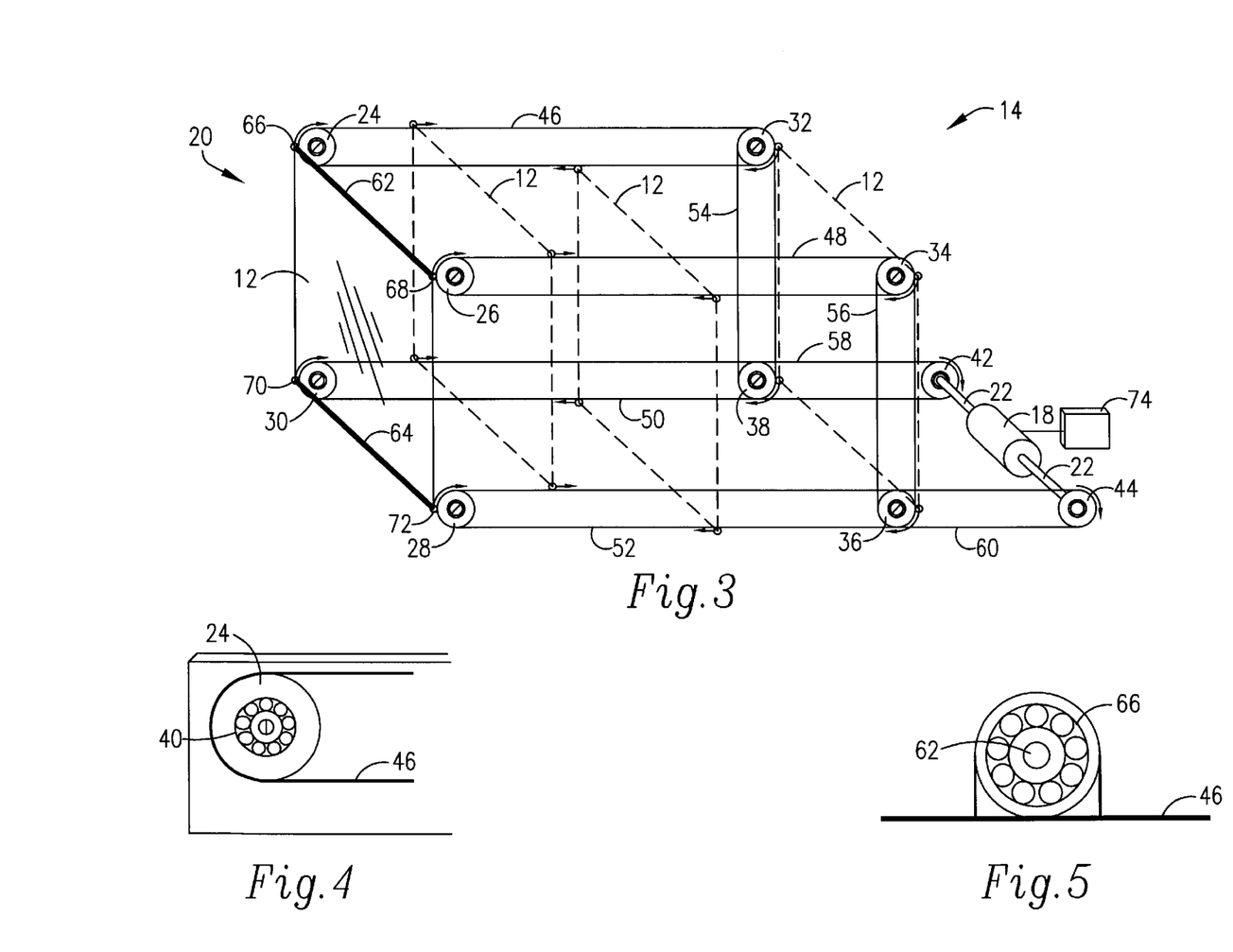
FIG. 3 is a schematic diagram shown in isometric view of a preferred embodiment of the screen and screen moving assembly of the display apparatus.
FIG. 4 is an enlarged view of one of the pulleys of the screen moving assembly.
FIG. 5 is an enlarged view of one of the bearings of the screen moving assembly.

The drawing figures illustrate a three-dimensional display apparatus 10 constructed in accordance with the preferred embodiments of the present invention. The display apparatus generates and displays true three-dimensional images that can be viewed without the use of specially designed three-dimensional glasses. As best illustrated in FIGS. 1 and 3, the display apparatus broadly includes a screen 12, a screen moving assembly 14 for moving the screen to a plurality of different depth locations, and an imaging assembly generally referred to by the numeral 16 for generating and displaying images on the screen while the screen is moved between its different depth locations. In general, the display apparatus generates and displays three-dimensional images by separating a signal representative of a three-dimensional image into its component two-dimensional images, successively generating the two-dimensional images with the imaging assembly, and projecting the two-dimensional images one at a time onto the screen as the screen is moved between its different depth locations.

In more detail, the screen 12 is preferably a conventional cloth screen and may be formed in any desired size so that the display apparatus 10 may be used for any application including personal viewing and group viewing such as in a theater. The screen may alternately be formed of a plane of liquid crystals that are switched to selectively turn the excitation voltage to the liquid crystals on or off. When the excitation voltage is turned off, the liquid crystals scatter light incident from one side of the screen so that the screen appears translucent.

As best illustrated in FIG. 3, the top of the screen 12 is attached to a rod 62 that extends across the width or y-axis of the viewing region. Similarly, the bottom of the screen is attached to a rod 64 that extends across the width of the viewing region.

The screen moving assembly 14, which is best illustrated in FIG. 3, moves the screen 12 back and forth along the z-axis or depth space of a three-dimensional viewing region illustrated in FIG. 2. The z-axis of the viewing region is divided into "Z1"–"Zp" depth locations. The screen moving assembly successively moves the screen between each of these "Z1"–"Zp" depth locations. Applicant has discovered that a depth space of approximately 300 mm (approximately 12") and a screen depth separation of approximately 0.5 mm are desirable for displaying realistic-looking three-dimensional images. Thus, the screen moving assembly preferably moves the screen to approximately 600 different depth locations along the z-axis of the viewing region.

As best illustrated in FIGS. 3–54, the preferred screen moving assembly 14 includes a motor 18 and a pulley system 20 rotatably coupled with the motor. The motor preferably has a pair of rotating shafts 22. The pulley system includes four spaced pulleys 24,26,28,30 positioned at the four corners of the "Z1" depth location of the screen 12 and four spaced pulleys 32,34,36,38 positioned at the four corners of the "Zp" depth location of the screen. Each pulley 26–38 is rotatably mounted to a support surface by a bearing assembly 40 as illustrated in FIG. 4.

The pulley system also includes two additional pulleys 42,44 each attached to one of the rotating shafts 22 of the motor 18. The pulleys 24–38 and 40,42 are interconnected by a plurality of belts 46,48,50,52,54,56,58,60 so that the pulleys jointly rotate with the shafts 22 of the motor 18.

The screen 12 is attached to the belts 46,48,50,52 so that it is moved back and forth along the z-axis of the viewing region as the pulleys are rotated by the motor. Specifically, the ends of the screen rod 62 are attached to bearings 66,68 that are coupled with belts 46,48. Similarly, the ends of the screen rod 64 are attached to bearings 70,72 that are coupled with belts 50,52. As illustrated in FIG. 5, the outer surface of each bearing 66–72 is fixed to its corresponding belt, and the inner surface of each bearing is connected to its corresponding rod. Thus, the screen moves with the belts 46,48, 50,52 between the depth locations "Z1"–"Zp" as the motor 18 rotates the pulleys 24–8. Specifically, the screen moving assembly 14 moves the screen 12 back and forth along the z-axis of the viewing region between the "Z1" location as depicted by the solid lines in FIG. 3 and the "Zp" location and several intermediate locations depicted by the dashed lines.

Advantageously, the screen moving assembly 14 moves the screen 12 back and forth along the depth of the viewing region without ever completely stopping the screen. As a result, vibration and noise associated with the movement of the screen is minimized. To further reduce the noise and vibration of the moving assembly 14, the bearings 40 and 66–72 can be replaced by magnetic bearings or superconductive magnetic bearings. This construction is desirable where large projection screens are used such as in theaters.

Additionally, the entire display apparatus 10 may be enclosed in a partially evacuated chamber to reduce the air friction or drag on the screen 12 while the screen is moved back and forth by the screen moving assembly 14. Moreover, the screen alone may be enclosed in an aerodynamically designed transparent container coated with anti-reflection material to further reduce the air resistance on the screen. The evacuated chamber and transparent container reduce the amount of force that must be exerted on the screen to move it to various locations and therefore also reduce the noise and vibration of the display apparatus.

As illustrated in FIG. 3, the screen moving assembly 14 also preferably includes an encoder 74 coupled with the motor 18 for sensing the exact rotational position of the shafts 22 and therefore the position of the screen 12. The encoder generates a position signal that is sent to the imaging assembly 16 for synchronizing the operation of the imaging assembly with the positioning of the screen.

Figure 6:
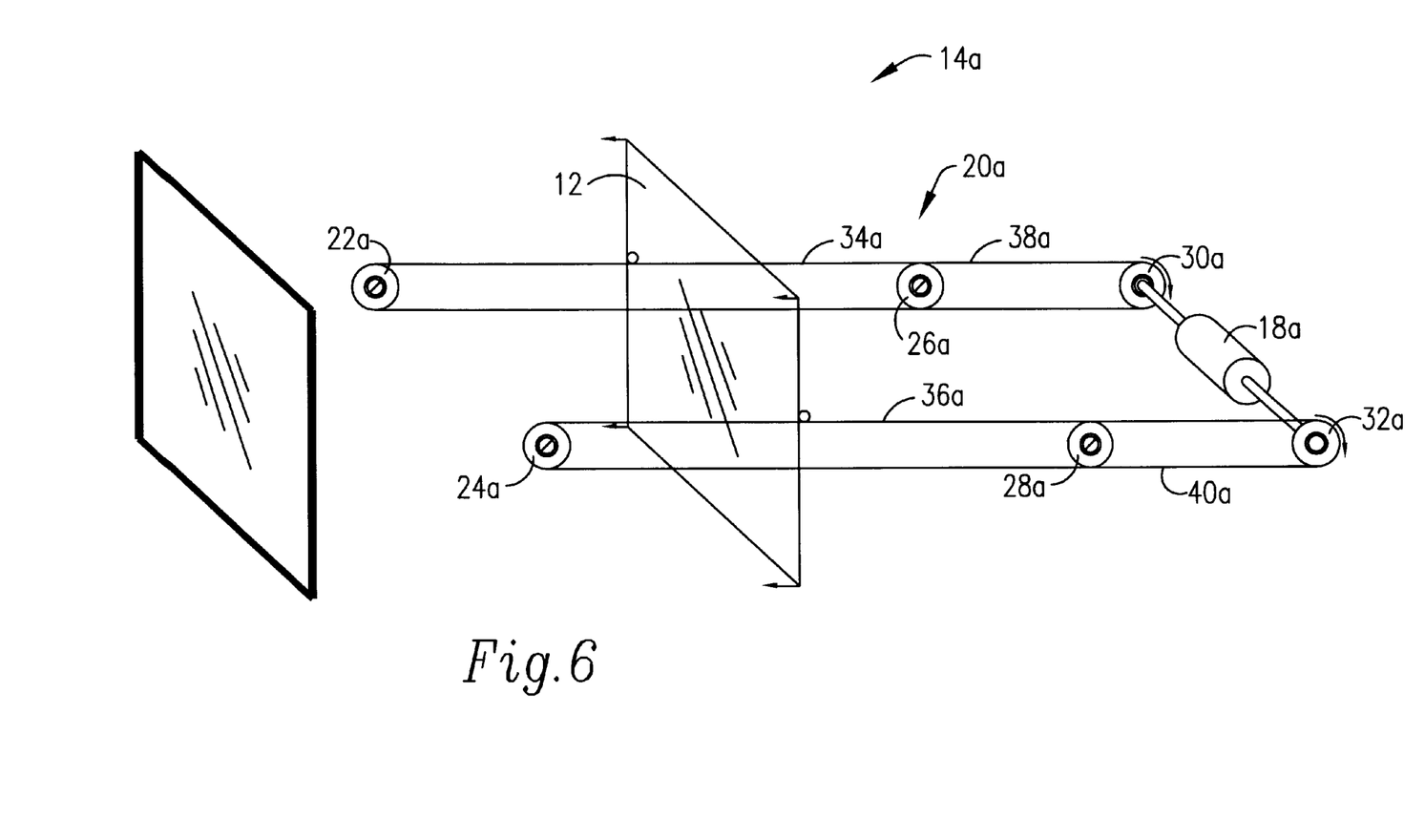
FIG. 6 is a schematic diagram shown in isometric view of an alternate embodiment of the screen and screen moving assembly of the display apparatus.

FIG. 6 illustrates an alternate embodiment of the screen moving assembly 14a that includes a motor 18a and a pulley system 20a rotatably coupled with the motor. The pulley system includes two spaced pulleys 22a,24a positioned on opposite sides of the "Z1" depth location of the screen 12, two spaced pulleys 26a,28a positioned on opposite sides of the "Zp" depth location of the screen, two spaced pulleys 30a, 32a coupled to the shafts of the motor, and four belts 34a,36a,38a,40a interconnecting the pulleys. The vertical side margins of the screen are rigidly connected to the belts 34a, 36a so that the screen is rotated 180° when it reaches both the "Z1" and "Zp" depth locations during its travel.

Figure 7:
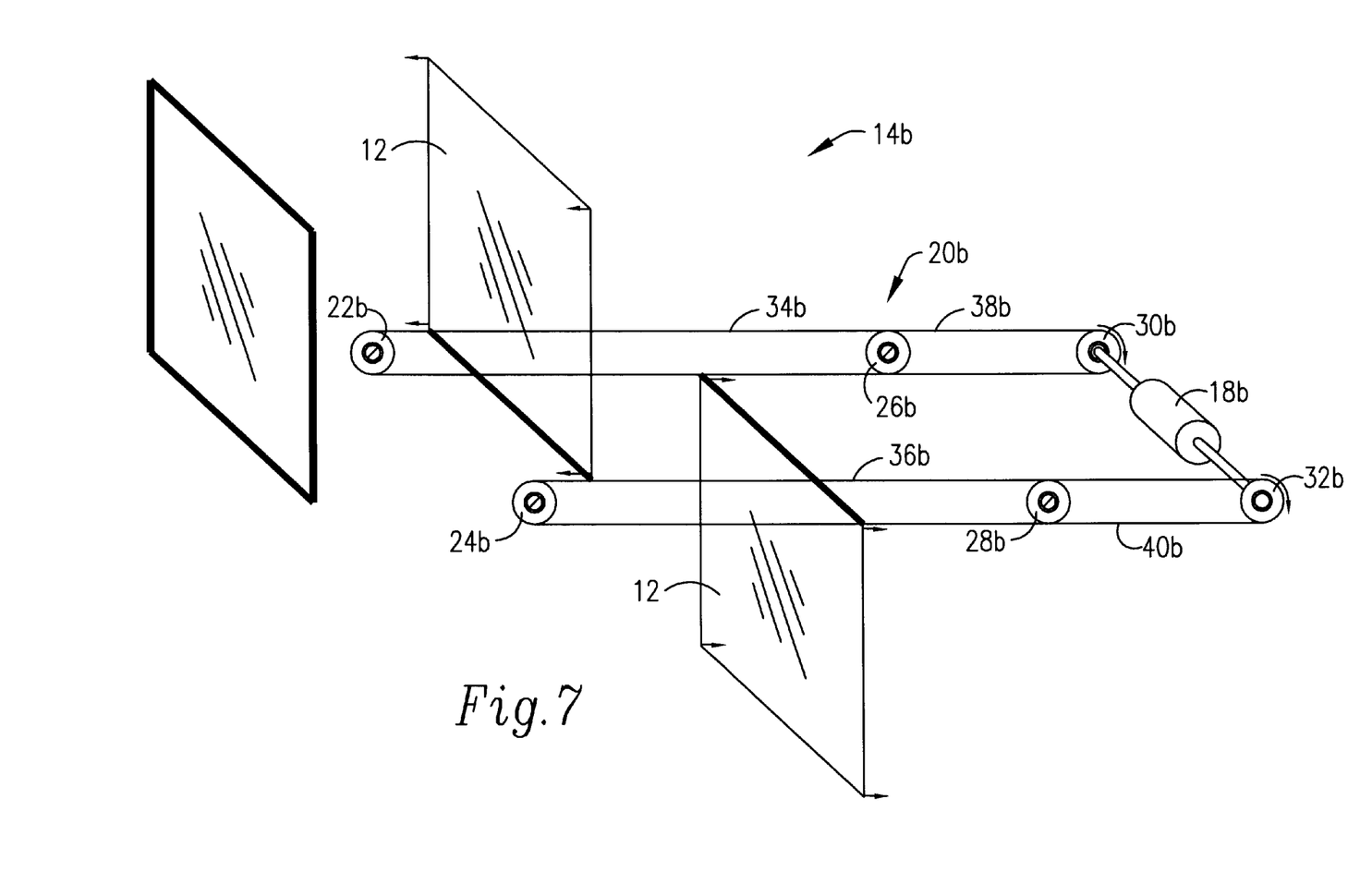
FIG. 7 is a schematic diagram shown in isometric view of a further alternate embodiment of the screen and screen moving assembly of the display apparatus.

FIG. 7 illustrates another alternate embodiment of the screen moving assembly 14b that includes a motor 18b and a pulley system 20b rotatably coupled with the motor. The pulley system includes two spaced pulleys 22b,24b positioned on opposite sides of the "Z1" depth location of the screen 12, two spaced pulleys 26b,28b positioned on opposite sides of the "Zp" depth location of the screen, two spaced pulleys 30b,32b coupled to the shafts of the motor, and four belts 34b,36b,38b,40b interconnecting the pulleys. In the FIG. 7 embodiment, two screens 12 are rigidly connected to the belts 34b,36b 180° out of phase from one another and both the screens are rotated 180° when they reach their "Z1" and "Zp" depth locations during their travel. The viewing area of the screen allows viewers to view only the screen that rides on the upper portion of the belts 34b,36b. This construction insures that only one screen is in view at a time.

Figures 8, 9, 10:
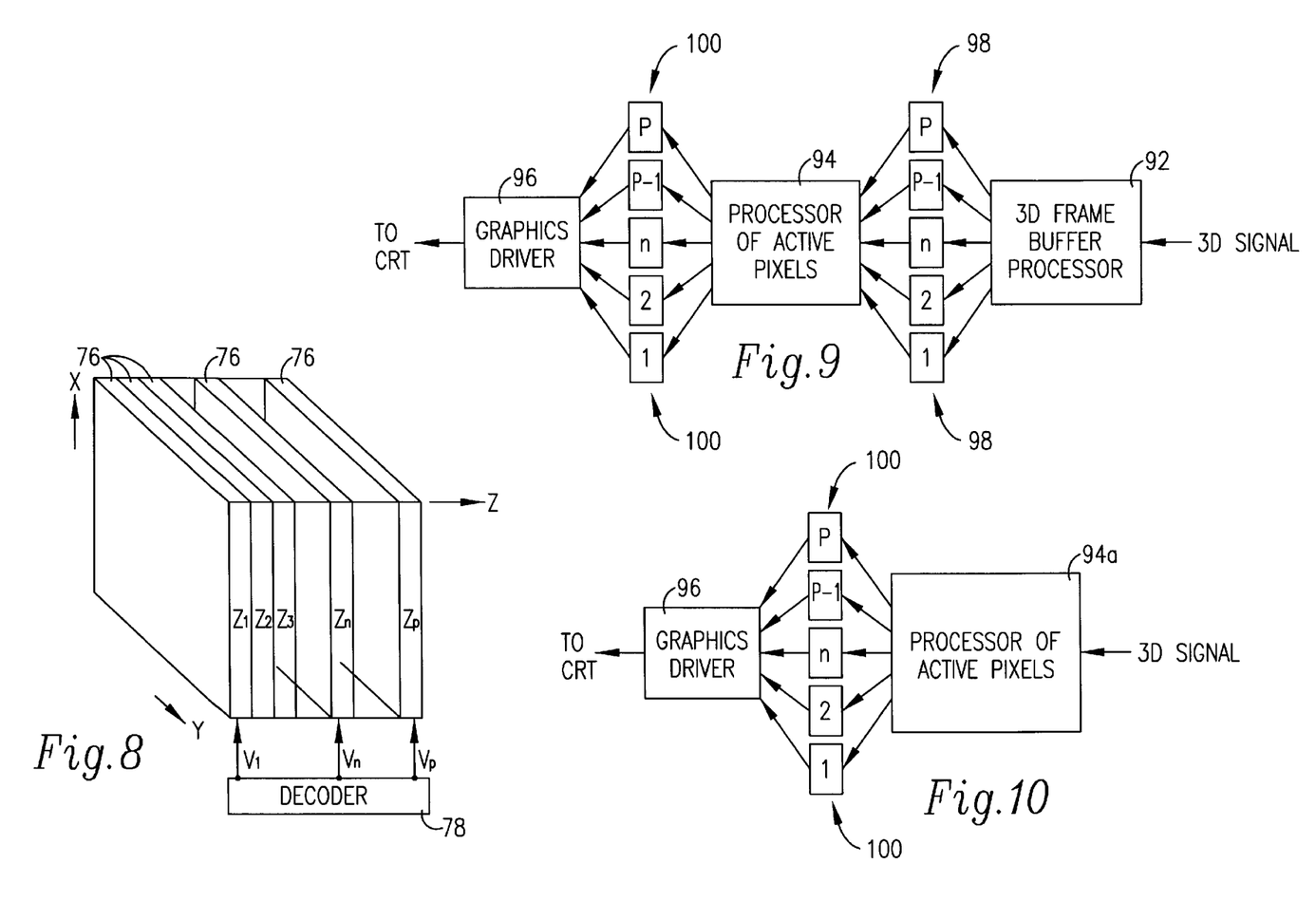
FIG. 8 is a schematic diagram in isometric view of an alternate embodiment of the screen.
FIG. 9 is a schematic and block diagram illustrating one embodiment of the control system of the imaging assembly.
FIG. 10 is a schematic and block diagram illustrating an alternate embodiment of the control system of the imaging assembly.

FIG. 8 illustrates an alternate embodiment of the invention wherein the single screen 12 and screen moving assembly 14 are replaced with a plurality of fixed screens 76 each occupying one of the depth locations "Z1"–"Zp" along the z-axis of the viewing region. Each fixed screen is preferably formed from electro-optic or magneto-optic materials and can be switched between transparent and translucent states. Specifically, each screen is designed to pass light when a voltage is applied to the screen and to diffuse the incoming light when the voltage signal is removed from the screen. By forming the screens of electrooptic or magneto-optic materials, the amount of light diffusion by the screens can be controlled to make the screens useful as projection screens.

The fixed screens 76 of this alternate embodiment are switched between their transparent and translucent states by a decoder 78. The decoder activates each of the screens sequentially for a short time interval so that only one screen is translucent at any given moment. While a screen is translucent, the imaging assembly 16 generates and projects the appropriate two-dimensional image on the screen as described in more detail below.

The imaging assembly 16, which is best illustrated in FIG. 1, generates and projects a different two-dimensional image on the moveable screen 12 each time the screen is moved to one of its various depth locations "Z1"–"Zp" or each time a different one of the fixed screens 76 is made translucent. The preferred imaging assembly includes a CRT 80 for generating the two-dimensional images, a focusing system 82 for focusing the images from the CRT to the screen 12, and a control system 84 for controlling the operation of the CRT and synchronizing the generation of the two-dimensional images with the positioning of the screen.

The CRT is conventional and includes a plurality of pixels. The CRT preferably has a VGA format with 640×480 pixels. The focusing system 82 projects and focuses the images created by the CRT 80 onto the screen 12 as the screen is moved between its various depth locations "Z1"–"Zp". Because the preferred display apparatus has a depth space of 12", the focusing system must focus the images generated by the CRT on the screen over a 12" depth space.

The preferred focusing system includes a focusing lens 86 positioned in front of the CRT 80 and a focusing plate 88 having a small aperture 90 therein positioned between the lens and the screen 12. The size of the aperture determines the depth of focus of the lens. Specifically, as the aperture is made smaller, the depth of focus of the lens increases. However, as the aperture is made smaller, the amount of energy transferred to the screen by the lens is reduced, and therefore a more powerful CRT must be used. Applicant has discovered that an aperture having an f-stop in the range of 5.6–8.0 best balances the trade-off between the depth of focus of the lens and the energy transfer to the screen.

In an alternate embodiment of the focusing system, the focusing lens can be positioned to focus the images from the CRT to the front plane "Z1", when the aperture is fully open. As the screen moves from "Z1" to "Zp", electronic impulses are used to reduce the size of the aperture as is done in most modern cameras. The size of the aperture is increased when the screen moves from "Zp" to "Z1". This configuration achieves higher power for the images formed at higher distances from the focusing lens, as compared to the fixed aperture configuration, at the expense of using an electronically controlled aperture.

In another alternate embodiment of the focusing system, the focusing lens 86 is moved back and forth by a stepper motor over a distance of a few millimeters. On moving the focusing lens over this small distance, the images created a by the CRT can be focused properly over the entire depth region of the display apparatus 10 without the use of a small apertured focusing plate 88. In this configuration, the power requirements of the CRT are reduced at the expense of the cost of the electromechanical lens movement system.

The control system 84, which is electrically coupled with the CRT 80, receives three-dimensional signals from the sources described above and drives the CRT in response thereto to generate and project the two-dimensional images on the screen 12 while the screen is moved between its various depth locations. As best illustrated in FIG. 9, the preferred control system includes a three-dimensional frame buffer processor 92, an active pixel processor 94, and a graphics driver 96.

The frame buffer processor 92 receives signals representative of three-dimensional images and separates the three-dimensional images into their component two-dimensional images. Specifically, the processor allocates every picture element in a three-dimensional image as a pixel of one of the "P" display planes and stores the information for all of the display planes in display-plane buffers 98. Thus, the processor creates a three-dimensional frame buffer that consists of "P" two-dimensional arrays stored in "P" display plane buffers.

The following is an example of the operation of the frame buffer processor 92. For simplification, assume that the CRT 80 has 8×8 pixels, and an element of a three-dimensional scene can reside at any one of eight different depth planes. Table 1 below illustrates the contents of a conventional depth buffer for this three-dimensional scene that defines the depth location of each element of the scene. For example, row 1, column 1 of the table indicates that pixel 1,1 resides at a depth location of 2; and row 3, column 6 indicates that pixel 3,6 resides at a depth location of 1.

Table-1:
Depth Buffer of a Scene with 8 × 8 pixels

|  | Column Number | | | | | | | |
|---|---|---|---|---|---|---|---|---|
| Row Number | 1 | 2 | 3 | 4 | 5 | 6 | 7 | 8 |
| 1 | 2 | 6 | 4 | 5 | 6 | 7 | 1 | 7 |
| 2 | 6 | 3 | 4 | 8 | 7 | 9 | 5 | 4 |
| 3 | 1 | 3 | 3 | 6 | 4 | 1 | 2 | 6 |
| 4 | 8 | 2 | 3 | 6 | 2 | 2 | 6 | 8 |
| 5 | 7 | 5 | 8 | 1 | 7 | 4 | 2 | 3 |
| 6 | 3 | 6 | 5 | 8 | 1 | 7 | 8 | 7 |
| 7 | 3 | 5 | 3 | 8 | 2 | 6 | 3 | 8 |
| 8 | 8 | 3 | 2 | 1 | 7 | 3 | 6 | 7 |

For the same example, Table 2 below illustrates the content of the frame buffer for this three-dimensional image that shows the row number of a color table used to turn on every pixel of the 8×8 array. For example, row 1, column 1 of the Table indicates that the pixel 1,1 will be turned on with an intensity and color defined by the content of the row number 20 of a color table. Similarly, the pixel 3,6 will use the row number 81 of the color table. Each row of the color table usually consists of three numbers defining the intensities of the red, green, and blue colors for the pixel.

Table-2:
Frame Buffer of a Scene with 8 × 8 pixels

|  |  | Column Number |  |  |  |  |  |  |  |
|---|---|---|---|---|---|---|---|---|---|
|  |  | 1 | 2 | 3 | 4 | 5 | 6 | 7 | 8 |
| Row Number | 1 | 20 | 36 | 24 | 15 | 86 | 67 | 11 | 77 |
|  | 2 | 56 | 33 | 44 | 55 | 76 | 92 | 51 | 44 |
|  | 3 | 01 | 53 | 29 | 66 | 39 | 81 | 72 | 96 |
|  | 4 | 11 | 12 | 13 | 16 | 32 | 42 | 22 | 49 |
|  | 5 | 71 | 57 | 48 | 41 | 37 | 34 | 19 | 33 |
|  | 6 | 33 | 39 | 55 | 28 | 71 | 27 | 78 | 37 |
|  | 7 | 93 | 45 | 33 | 88 | 32 | 66 | 33 | 58 |
|  | 8 | 83 | 33 | 27 | 41 | 27 | 37 | 63 | 99 |

The frame buffer processor 92 processes the contents of the above depth and frame buffers and produces 8 two-dimensional arrays corresponding to the eight depth planes of the three-dimensional image. The frame buffer processor then stores these two-dimensional arrays in the display plane buffers 98. Tables 3 and 4 below illustrate the contents of the first and eighth display plane buffers created by the frame buffer processor for this example.

Table-3:
Contents of the Display-Plane Buffer No.1

|  |  | Column Number |  |  |  |  |  |  |  |
|---|---|---|---|---|---|---|---|---|---|
|  |  | 1 | 2 | 3 | 4 | 5 | 6 | 7 | 8 |
| Row Number | 1 | 0 | 0 | 0 | 0 | 0 | 0 | 11 | 0 |
|  | 2 | 0 | 0 | 0 | 0 | 0 | 0 | 0 | 0 |
|  | 3 | 1 | 0 | 0 | 0 | 0 | 81 | 0 | 0 |
|  | 4 | 0 | 0 | 0 | 0 | 0 | 0 | 0 | 0 |
|  | 5 | 0 | 0 | 0 | 41 | 0 | 0 | 0 | 0 |
|  | 6 | 0 | 0 | 0 | 0 | 71 | 0 | 0 | 0 |
|  | 7 | 0 | 0 | 0 | 0 | 0 | 0 | 0 | 0 |
|  | 8 | 0 | 0 | 0 | 41 | 0 | 0 | 0 | 0 |

Table-4:
Contents of the Display-Plane Buffer No.8

|  |  | Column Number |  |  |  |  |  |  |  |
|---|---|---|---|---|---|---|---|---|---|
|  |  | 1 | 2 | 3 | 4 | 5 | 6 | 7 | 8 |
| Row Number | 1 | 0 | 0 | 0 | 0 | 0 | 0 | 0 | 0 |
|  | 2 | 0 | 0 | 0 | 55 | 0 | 0 | 0 | 0 |
|  | 3 | 0 | 0 | 0 | 0 | 0 | 0 | 0 | 0 |
|  | 4 | 11 | 0 | 0 | 0 | 0 | 0 | 0 | 49 |
|  | 5 | 0 | 0 | 48 | 0 | 0 | 0 | 0 | 0 |
|  | 6 | 0 | 0 | 0 | 28 | 0 | 0 | 78 | 0 |
|  | 7 | 0 | 0 | 0 | 88 | 0 | 0 | 0 | 48 |
|  | 8 | 83 | 0 | 0 | 0 | 0 | 0 | 0 | 0 |

At this point, the graphics driver 96 would access the contents of these display plane buffers 98 and then turn on the appropriate pixels of the CRT 80 in synchronization with the back and forth movement of the screen 12. However, because: (1) the preferred display apparatus 10 moves the screen 12 to 600 different depth locations, (2) the CRT has 640×480 pixels, and (3) an image needs to be projected to each depth location of the viewing region at least 30 times per second, the graphics driver of the CRT would have to operate at a frequency of 600×640×480×30 (which equals approximately 5.4 Ghz) to generate acceptable three-dimensional images. This speed is more than 20 times greater than the speed of conventional graphics drivers used with the monitors for personal computers.

The present invention solves this problem by recognizing that not all of the pixels of the CRT are active for each two-dimensional image of the overall three-dimensional image. For example, Table 3 illustrates that many of the pixels for the display-plane buffer No. 1 have a "0" color table value, which basically represents "0" intensity for the pixel. These pixels are not activated by the CRT and thus do not have to be accessed by the CRT.

The active pixels processor 94 takes advantage of this phenomenon by directing the CRT 80 to access only the active pixels for each two-dimensional image. The active pixels processor does this by scanning every display-plane buffer 98 and generating a corresponding active pixels buffer 100 as illustrated in FIG. 9. Table 5 illustrates the contents of the active pixels buffer for the display-plane buffer No. 8 set forth in Table 4.

Table-5:
Contents of the Active-Pixels Display-Plane Buffer No.8

|  |  | Column Number |  |  |  |  |  |  |  |
|---|---|---|---|---|---|---|---|---|---|
|  |  | 1 | 2 | 3 | 4 | 5 | 6 | 7 | 8 |
| Row Number | 1 | 2 | 4 | 55 | 0 |  |  |  |  |
|  | 2 | 4 | 1 | 11 | 8 | 49 | 0 |  |  |
|  | 3 | 5 | 3 | 48 | 0 |  |  |  |  |
|  | 4 | 6 | 4 | 28 | 7 | 78 | 0 |  |  |
|  | 5 | 7 | 4 | 88 | 8 | 48 | 0 |  |  |
|  | 6 | 0 |  |  |  |  |  |  |  |
|  | 7 |  |  |  |  |  |  |  |  |
|  | 8 |  |  |  |  |  |  |  |  |

In Table 5, the first byte of each row defines the row number (r) of the pixel of the display-plane 8 that needs to be accessed. For each row of the active-pixels display-plane buffer, the content of the even numbered columns define the column number (c) of the pixel that needs to be accessed. The row number of the color table that is used to access the pixel is defined by the content of the next higher odd numbered column. For example, the first row of the active-pixels display-plane frame buffer number 8 above indicates that, for row 2 of the display-plane number 8, only the pixel at column 4 needs to be accessed. This accessing will be done by the content of the color table of row number 55. Similarly, the row number 4 of the active-pixels display-plane frame buffer number 8 defines that the pixel (6,4) will be accessed with a color table entry at row number 28 and the pixel (6,7) will be accessed with a color table entry at row number 78.

A "0" value at any column other than the first column of a row of the active pixel buffer set forth in Table 5 indicates to skip to the next row of the buffer. A value of "0" on the first column of a buffer indicates the end of accessing pixels of that plane.

FIG. 10 illustrates an alternate embodiment of the control system 84 in which a more powerful active pixels processor 94a directly creates the active-pixels buffers 100 by processing a three-dimensional signal without first separating the three-dimensional signal into its component two-dimensional images. This embodiment reduces the memory required since the two-dimensional images are not first stored in display-plane buffers 98; however, it requires a significantly more powerful active pixels processor.

The graphics driver 96, which is coupled between the active pixels buffers 100 and the CRT 80, scans the information in the buffers and activates only the active pixels of the CRT for each display plane. Such a scheme accesses only a limited number of pixels per plane, and therefore enables the display apparatus to access a larger number of projection planes with a traditional graphics driver. As discussed above, the graphics driver also receives a screen position signal from the encoder 74 and synchronizes the imaging assembly 16 with the movement of the screen.

OPERATION

The operation of the display apparatus 10 is best understood with reference to FIG. 2, which illustrates an exemplary three-dimensional viewing region created by the display apparatus. The x-y plane of the viewing region represents the viewing plane of an observer, and the z-axis represents the depth of the viewing region. The viewing region is divided into "P" discrete locations of equal size along its z-axis. The depth "dz" of each "P" region is small enough so that the entire volume of the region can be considered as consisting of "P" two-dimensional viewing planes.

The display apparatus 10 moves the screen 12 back and forth in the viewing region along the z-axis to each of the "P" locations. Thus, the screen is initially moved from the "Z1" location to the "Zp" location and then back to the "Z1" location.

While the screen 12 is being moved, the imaging assembly 16 successively generates two-dimensional images on the CRT 80 as described above and projects and focuses these images on the screen in synchronization with the movement of the screen so that each two-dimensional image is projected to its proper depth location. For example, when the screen is moved to the position "Z1" illustrated in FIG. 2, the imaging assembly generates the two-dimensional image corresponding to this first plane of the three-dimensional image and projects this image onto the screen. Then, when the screen is moved to the position "Z2", the imaging assembly generates and projects the image corresponding to the second plane onto the screen. These procedures are repeated for every plane in the viewing region at a rate rapid enough to enable a viewer to visualize a three-dimensional display of the images.

For the embodiment illustrated in FIG. 8, each plane of the liquid crystals can be switched to behave as a translucent screen over a short time in an appropriate sequence so that the plane of projection actually moves from front to back repeatedly at a high speed. Flicker-free three-dimensional images can be visualized by accessing each projection plane at a rate greater than 30 times per second.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

1. A three-dimensional display apparatus comprising:
   a screen;
   means for moving the screen to a selected number of different depth locations along a longitudinal axis defining a screen travel path including a predetermined vertical offset along said longitudinal axis; and
   an imaging assembly for displaying images on the screen as it is moved, the imaging assembly including
      signal processing means for receiving a signal representative of a three-dimensional image and for separating the signal into a plurality of signals each representative of a two-dimensional image in the three-dimensional image, and
      image generating means operably coupled with the signal separating means for generating on the screen the two-dimensional images as the screen is moved by the moving means.

2. The display apparatus as set forth in claim 1, said imaging assembly including means for successively generating one of the two-dimensional images on the screen each time the screen is moved to a different depth location.

3. The display apparatus as set forth in claim 1, the image generating means including a CRT having a plurality of pixels for generating the two-dimensional images and a focusing system for focusing the two-dimensional images from the CRT to the screen as the screen is moved by the moving means.

4. The display apparatus as set forth in claim 1, the signal processing means including a frame buffer processor.

5. The display apparatus as set forth in claim 4, further including a plurality of memory buffers coupled with the frame buffer processor for storing the signals representative of the two-dimensional signals.

6. The display apparatus as set forth in claim 1, said imaging assembly further including means for accessing only the pixels on the CRT that are active for each two-dimensional image.

7. The display apparatus as set forth in claim 6, the accessing means including an active pixel processor.

8. The display apparatus as set forth in claim 1, wherein the screen is formed of lightweight translucent material.

9. The display apparatus as set forth in claim 1, wherein the screen is formed of liquid crystals.

10. The display apparatus as set forth in claim 1, the screen moving means including means for moving the screen to its various depth locations without stopping the screen.

11. The display apparatus as set forth in claim 10, the screen moving means including
   a motor having a rotatable shaft,
   a pulley positioned at one end of the screen travel path,
   a pulley positioned at an opposite end of the screen travel path,
   coupling means for coupling the pulleys for rotation with the motor shaft,
   a belt trained over the pulleys, and
   means for coupling the screen with the belt so that the screen is moved along the screen travel path when the motor shaft is rotated.

12. The display apparatus as set forth in claim 11, further including an encoder operably coupled with the motor for sensing the position of the screen and controlling the operation of the imaging assembly in response thereto to synchronize the generation of the two-dimensional images with the movement of the screen.

13. The display apparatus as set forth in claim 1, further including an enclosure for enclosing the screen, the enclosure being partially evacuated for reducing the air friction on the screen as it is moved by the moving means.

14. A three-dimensional display apparatus comprising:

a screen;

means for moving the screen to a selected number of different depth locations along a longitudinal axis defining a screen travel path including a predetermined vertical offset along said longitudinal axis; and an imaging assembly for displaying images on the screen, the imaging assembly including
- a CRT having a plurality of pixels for generating two-dimensional images;
- a focusing system for focusing the images from the CRT to the screen, and
- a control system for driving and controlling the CRT, the control system including
  - signal processing means for receiving a signal representative of three-dimensional image and for separating the signal into a plurality of two-dimensional arrays each corresponding to one depth location of the screen and each representative of a two-dimensional image in the three-dimensional image,
  - a graphics driver coupled with the signal processing means for driving the CRT in accordance with the two-dimensional arrays for successively generating one of the two-dimensional images on the CRT each time the screen is moved to a different depth location, and
  - means for accessing only the pixels on the CRT that are active for each two-dimensional image.

15. The display apparatus as set forth in claim 14, the signal processing means including a processor.

16. The display apparatus as set forth in claim 14, the accessing means including a processor.

17. The display apparatus as set forth in claim 14, wherein the screen is formed of lightweight translucent material.

18. The display apparatus as set forth in claim 14, wherein the screen is formed of liquid crystal displays.

19. The display apparatus as set forth in claim 14, the screen moving means including means for moving the screen to its various depth locations without stopping the screen.

20. The display apparatus as set forth in claim 14, the moving means including
- a motor having a rotatable shaft,
- a pulley positioned at one end of the screen travel path,
- a pulley positioned at an opposite end of the screen travel path,
- coupling means for coupling the pulleys with the motor shaft,
- a belt trained over the pulleys, and
- means for coupling the screen with the belt so that the screen is moved along the screen travel path when the motor shaft is rotated.

21. The display apparatus as set forth in claim 20, further including an encoder operably coupled with the motor for sensing the position of the screen and controlling the operation of the imaging assembly in response thereto to synchronize the operation of the imaging assembly with the position of the screen.

22. The display apparatus as set forth in claim 14, further including an enclosure for enclosing the screen, the enclosure being partially evacuated for reducing the air friction on the screen as it is moved by the moving means.

* * * * *